(12) United States Patent
Magel

(10) Patent No.: US 11,644,049 B2
(45) Date of Patent: May 9, 2023

(54) JET PUMP UNIT COMPRISING A METERING VALVE, FOR CONTROLLING A GASEOUS MEDIUM

(71) Applicant: Robert Bosch GmbH, Stuttgart (DE)

(72) Inventor: Hans-Christoph Magel, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 16/765,208

(22) PCT Filed: Oct. 9, 2018

(86) PCT No.: PCT/EP2018/077407
§ 371 (c)(1),
(2) Date: May 19, 2020

(87) PCT Pub. No.: WO2019/101415
PCT Pub. Date: May 31, 2019

(65) Prior Publication Data
US 2020/0280079 A1    Sep. 3, 2020

(30) Foreign Application Priority Data
Nov. 21, 2017 (DE) ............... 10 2017 220 800.7

(51) Int. Cl.
*F04F 5/16* (2006.01)
*F04F 5/46* (2006.01)
(52) U.S. Cl.
CPC ............ *F04F 5/16* (2013.01); *F04F 5/461* (2013.01); *F04F 5/463* (2013.01)

(58) Field of Classification Search
CPC .... F04F 5/16; F04F 5/461; F04F 5/463; F04F 5/18; F04F 5/20; F04F 5/44; F04F 5/46; F04F 5/48
(Continued)

(56) References Cited

U.S. PATENT DOCUMENTS

| 9,598,990 B2 * | 3/2017 | Doko ............... F01M 13/023 |
| 2009/0311111 A1 * | 12/2009 | Yoshii .................. F04F 5/04 417/198 |

(Continued)

FOREIGN PATENT DOCUMENTS

| DE | 10259808 | 7/2003 |
| DE | 102010043618 | 5/2012 |
| JP | 2008196458 | 8/2008 |

OTHER PUBLICATIONS

International Search Report for Application No. PCT/EP2018/077407 dated Nov. 29, 2018 (English Translation, 2 pages).

*Primary Examiner* — Bryan M Lettman
(74) *Attorney, Agent, or Firm* — Michael Best & Friedrich LLP

(57) ABSTRACT

A jet pump unit (46) includes a pump housing (49), a metering valve (1) with a valve housing (2), a mixer tube area (52), an intake channel (43) and a runoff area (45). A through-hole (2) that forms a through-opening (80) is designed in said pump housing (49). The metering valve (1) is received in the through-opening (80) and a first step (200) and a second step (202) are formed in said through-opening (80), radially with respect to a longitudinal axis (40) of the jet pump unit (46), for the purpose of radially centering and guiding the metering valve (1) in said pump housing (49).

11 Claims, 3 Drawing Sheets

(58) Field of Classification Search
USPC .................................................. 417/187–189
See application file for complete search history.

(56) References Cited

U.S. PATENT DOCUMENTS

| | | | |
|---|---|---|---|
| 2009/0317691 A1* | 12/2009 | Yamada | F04F 5/18 |
| | | | 429/444 |
| 2012/0189927 A1* | 7/2012 | Kato | H01M 8/04089 |
| | | | 429/415 |
| 2017/0244116 A1 | 2/2017 | Fukuda et al. | |
| 2017/0244119 A1* | 8/2017 | Koyama | F04F 5/16 |
| 2018/0202270 A1* | 7/2018 | Falk | F04F 5/464 |

* cited by examiner

JET PUMP UNIT COMPRISING A METERING VALVE, FOR CONTROLLING A GASEOUS MEDIUM

BACKGROUND OF THE INVENTION

The invention concerns a jet pump unit with a metering valve for controlling a gaseous medium, in particular hydrogen, for example for use in vehicles with fuel cell drive.

DE 10 2010 043 618 A1 describes a jet pump unit with a metering valve for controlling a gaseous medium, in particular hydrogen, wherein the metering valve comprises a valve housing, an ejector unit, an actuator and a closing element. A passage opening, which can be opened or closed by the closing element at a valve seat, is formed in the valve housing. The ejector unit comprises an inflow region to which a first gaseous medium is supplied under pressure, an intake region at which a second medium is present, and a mixer tube region from which a mixture of the first and second gaseous media emerges. The passage opening is arranged between the inflow region and the intake region of the ejector unit.

SUMMARY OF THE INVENTION

Flushing processes in an anode path of a fuel cell arrangement can be optimized by a combination of a metering valve and a jet pump. For optimal function of the components concerned, a precise geometric orientation relative to each other is required.

The jet pump unit according to the invention with a metering valve for controlling a gaseous medium, in particular hydrogen, has the advantage that by optimized integration of the metering valve in the jet pump unit, a precise centering of the metering valve in the jet pump unit and hence improved function are achieved.

For this, the jet pump unit comprises a pump housing, a metering valve with a valve housing, a mixer tube region, an intake channel and an outlet region. A passage bore constituting a passage opening is formed in the pump housing. In addition, the metering valve is received in the passage opening, wherein a first step and a second step are formed in the passage opening, radially with respect to a longitudinal axis of the jet pump unit, for radially centering and guiding the metering valve in the pump housing.

By forming a first step and a second step in the passage bore, the coaxiality between the metering valve and the pump housing of the jet pump unit is improved. Thus a better mixing is achieved between the recirculated gaseous medium and the gaseous medium from the metering valve.

In a first advantageous refinement, it is provided that the metering valve comprises a nozzle with a passage channel, wherein the nozzle is arranged coaxially in the jet pump unit, in front of the mixer tube region, by means of the first step and second step. In this way, angular defects of the metering valve inside the pump housing are minimized.

In a further embodiment of the invention, it is advantageously provided that a supply channel is formed in the metering valve, which supply channel is formed at least partially in the pump housing, radially with respect to the longitudinal axis of the jet pump unit, and opens into the passage opening, wherein the valve housing is arranged by a step on the pump housing and is fixedly connected thereto, preferably by means of a screw element. Thus optimal integration of the metering valve in the pump housing is achieved in a structurally simple fashion.

In an advantageous refinement, the first step is arranged axially above the supply channel in the direction of the screw element, and the second step is arranged axially below the supply channel in the direction of the intake region. Thus slight angular tolerances of the metering valve in the pump housing are achieved.

In a further embodiment of the invention, it is advantageously provided that the passage bore is formed conical at least in portions, wherein an outlet channel of the jet pump unit is formed in the pump housing, radially with respect to the longitudinal axis of the jet pump unit, in the conical region of the passage bore. Advantageously, the supply channel opens into an inflow region inside the metering valve, wherein the inflow region is formed in the passage opening of the jet pump unit. By integrating the metering valve in the pump housing of the jet pump unit, it is possible to guide the flow of gaseous medium directly into the jet pump unit. This achieves an optimized design of the metering valve and jet pump unit.

The jet pump unit described is preferably suitable for use in a fuel cell arrangement for controlling a hydrogen supply to an anode region of a fuel cell. Advantages are the slight pressure fluctuations in the anode path and quiet operation.

BRIEF DESCRIPTION OF THE DRAWINGS

The drawing shows exemplary embodiments of the jet pump unit according to the invention and a metering valve for controlling a gas supply, in particular hydrogen, to a fuel cell. The drawing shows.

Components with the same function carry the same reference signs.

DETAILED DESCRIPTION

Figure 1:
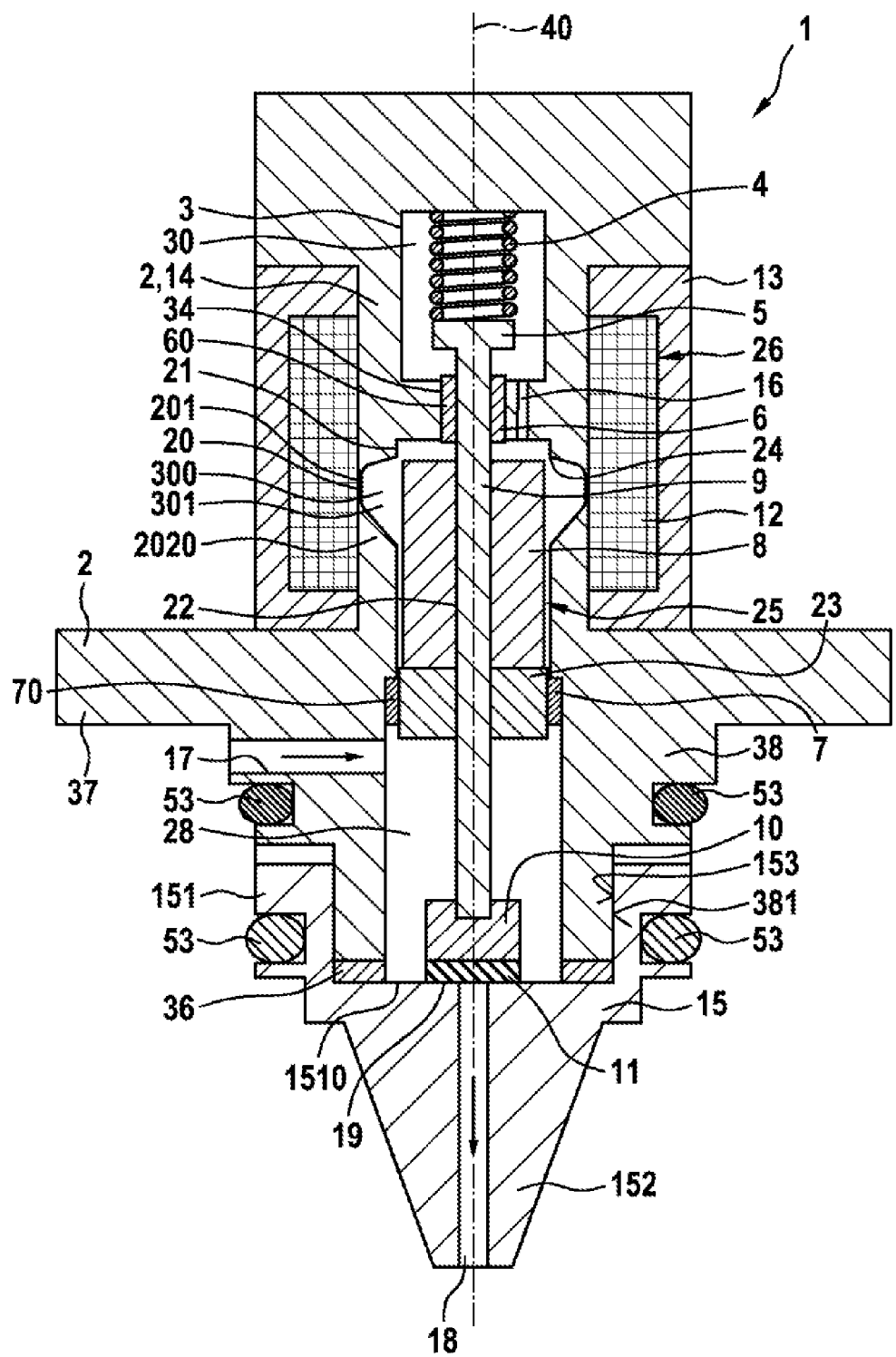
FIG. 1 in longitudinal section, an exemplary embodiment of the metering valve with a nozzle, FIG. 2 in longitudinal section, an exemplary embodiment of a jet pump unit according to the invention with the metering valve shown in FIG. 1, FIG. 3 an enlarged extract of the jet pump unit from FIG. 2 in the region of the passage opening, wherein only the right-hand side is shown.

FIG. 1 shows in longitudinal section a metering valve 1 as used in a jet pump unit 46 according to the invention. The metering valve 1 has a valve housing 2 with an interior 3. An electromagnet 26 is arranged in the interior 3 and comprises a magnetic coil 12, an inner pole 14 and an outer pole 30.

Furthermore, an armature device 25 which can execute a stroke movement is arranged in the interior 3. The armature device 25 comprises an armature 8 and a connecting element 9, which is received in a recess 22 of the armature 8 and is hence fixedly connected to the armature 8, for example by a weld seam or by a press fit. The armature 8 is configured as a solenoid plunger and is received in the inner pole 14. The inner pole 14 has a recess 21 with a recess edge 24 into which the armature 8 plunges on its lift movement.

First bearing bushes 60 are arranged in a recess 34 on the inner pole 14, and receive and guide the connecting element 9 at a first guide portion 6 of the inner pole 14. Furthermore, second bearing bushes 70 are arranged on the valve housing 2, and receive and guide a piston-like portion 23 of the connecting element 9 in a second guide portion 7. The piston-like portion 23 of the connecting element 9 is here made from a material with high mechanical strength.

Furthermore, the metering valve 1 comprises a nozzle 15 which has a pot-like region 151 with a pot base 1510, and a peg 152. A peg-like end 38 of the valve housing 2 facing away from the electromagnet 26 is received in the pot-like region 151 of the nozzle 15, wherein a face 381 of the valve housing 2 lies on a counter-face 153 of the nozzle 15. An adjustment element 36 is arranged between the peg-like end 38 of the valve housing 2 and the nozzle 15.

This is one possible embodiment of the nozzle 15. Alternatively, the nozzle 15 may also be received in the valve housing 2 of the metering valve 1 and be fixedly connected thereto.

One end of the connecting element 9 is fixedly connected to a closing element 10. The closing element 10 has an elastic sealing element 11 at its end facing away from the connecting element 9. The elastic sealing element 11 cooperates with a valve seat 19 formed on the pot base 1510 of the nozzle 15, so that when the elastic sealing element 11 rests on the valve seat 19, a passage channel 18 formed in the nozzle 15 is closed. The valve seat 19 is here formed as a flat seat.

A spring chamber 30 is formed in the inner pole 14 and forms part of the interior 3. A closing spring 4 is arranged in the spring chamber 30 and rests between the inner pole 14 and a plate-like end 5 of the connecting element 9. The closing spring 4 loads the armature device 25 with a force in the direction of the valve seat 19.

Furthermore, the interior 3 comprises an armature chamber 300 in which the armature 8 is arranged. The armature chamber 300 is connected to the spring chamber 30 via a connecting channel 16. At its end facing the closing element 10, the armature 8 adjoins an inflow region 28 which can be filled with a gaseous medium, for example hydrogen, via a supply channel 17 that is arranged radially with respect to a longitudinal axis 40 of the metering valve 1 of the jet pump unit 46 and formed in the valve housing 2.

The valve housing 2 and the inner pole 14 are connected together magnetically and mechanically via a magnetic choke point 20. Advantageously, they may be made from one piece. The magnetic choke point 20 comprises a thin-walled cylindrical web 201 and a conical region 2020, whereby a ring groove 301 is formed in the armature chamber 300.

The integral form of the valve housing 2 and inner pole 14 is merely one possible embodiment and, like the choke point 20, may also be omitted.

The function of the metering valve 1 is as follows:

When the magnetic coil 12 is not powered, the closing element 10 is pressed via the closing spring 4 onto the valve seat 19, so that the connection between the inflow region 28 and the passage channel 18 is interrupted and no gas flow occurs.

When the magnetic coil 12 is powered, a magnetic force is generated on the armature 8 which opposes the closing force of the closing spring 4. This magnetic force is transmitted to the closing element 10 via the connecting element 9, so as to overcome the closing force of the closing spring 4, and the closing element 10 with elastic sealing element 11 lifts away from the valve seat 19. A gas flow through the metering valve 1 is possible.

The lift of the closing element 10 may be adjusted via the level of the current intensity at the magnetic coil 12. The greater the current intensity at the magnetic coil 12, the greater the lift of the closing element 10 and the greater the gas through-flow in the metering valve 1, since the force of the closing spring 4 is lift-dependent. If the current intensity at the magnetic coil 12 is reduced, the lift of the closing element 10 is also reduced and hence the gas through-flow is choked.

If the current at the magnetic coil 12 is interrupted, the magnetic force on the armature 8 is dissipated, so that the force on the closing element 10 from the connecting element 9 is reduced. The closing element 10 moves in the direction of the passage channel 18 and seals against the valve seat 19 via the elastic sealing element 11. The gas through-flow in the metering valve 1 is interrupted.

The metering valve 1 of the jet pump unit 46 according to the invention may be used for example in a fuel cell arrangement. Hydrogen from a tank can be supplied to an anode region of the fuel cell by means of the metering valve 1. Depending on the current intensity at the magnetic coil 12 of the metering valve 1 which actuates the lift of the closing element 10, a flow cross-section at the passage channel 18 is changed such that the gas flow supplied to the fuel cell can be continuously adjusted to meet demand.

The metering valve 1 for controlling a gaseous medium thus has the advantage that the supply of the first gaseous medium and the metered supply of hydrogen to the anode region of the fuel cell can be made substantially more precise by means of the electronically controlled adaptation of the flow cross-section of the passage channel 18 with simultaneous regulation of the anode pressure. In this way, the operating reliability and durability of the connected fuel cell are significantly improved, since hydrogen is always supplied in super-stoichiometric proportion. Also, consequential damage, such as for example damage to a downstream catalytic converter, can be prevented.

Figure 2:
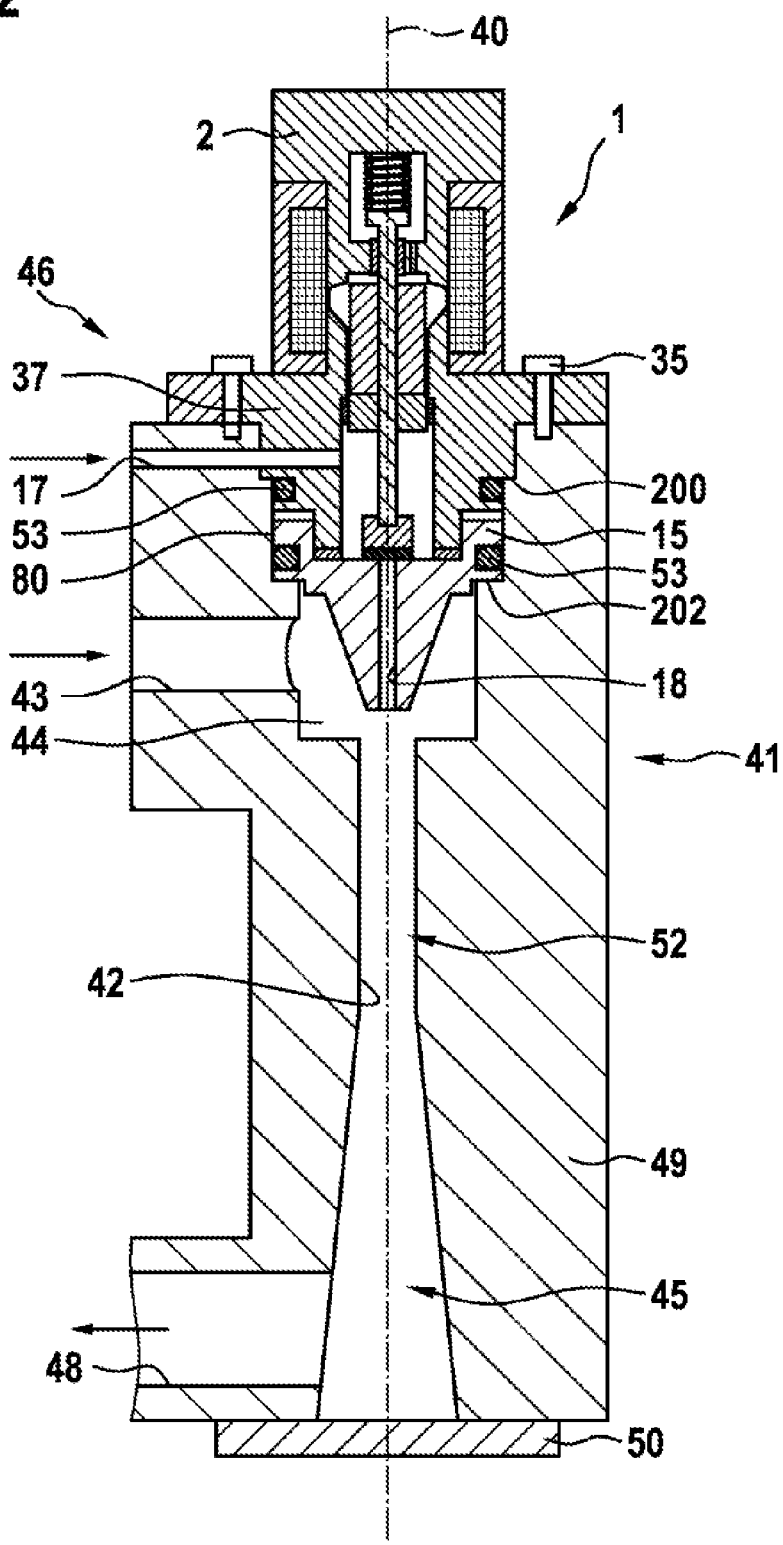

FIG. 2 shows in longitudinal section an exemplary embodiment of a jet pump unit 46 according to the invention with the metering valve 1. The jet pump unit 46 has a jet pump housing 41 which comprises the valve housing 2 of the metering valve 1 and a pump housing 49. The jet pump unit 46 has the longitudinal axis 40 which is identical to the longitudinal axis of the metering valve 1.

In the pump housing 49, a partially stepped and partially conical passage bore 42 is formed axially with respect to the longitudinal axis 40, and an intake channel 43 and the supply channel 17 of the metering valve 1 are formed radially with respect to the longitudinal axis 40. An intake region 44, a mixer tube region 52 and an outlet region 45 are formed in the passage bore 42. The metering valve 1 is partially received in a passage opening 80 of the passage bore 42, coaxially in the pump housing 49. The valve housing 2 is arranged by a step 37 on the pump housing 49, and is fixedly connected thereto via several screw elements 35. Furthermore, sealing elements 53 are arranged on the valve housing 2 and on the nozzle 15, so that the valve housing 2 and pump housing 49 are sealed against each other. Gaseous medium from the supply channel 17 thus only passes in the direction of the intake region 44 via the passage channel 18.

At the end region of the pump housing 49 facing away from the metering valve 1, an outlet channel 48 is formed in the pump housing 49, radially with respect to the longitudinal axis 40, wherein the passage bore 42 is sealed with a cover 50 at the end region of the pump housing 49 facing away from the metering valve 1.

Figure 3:
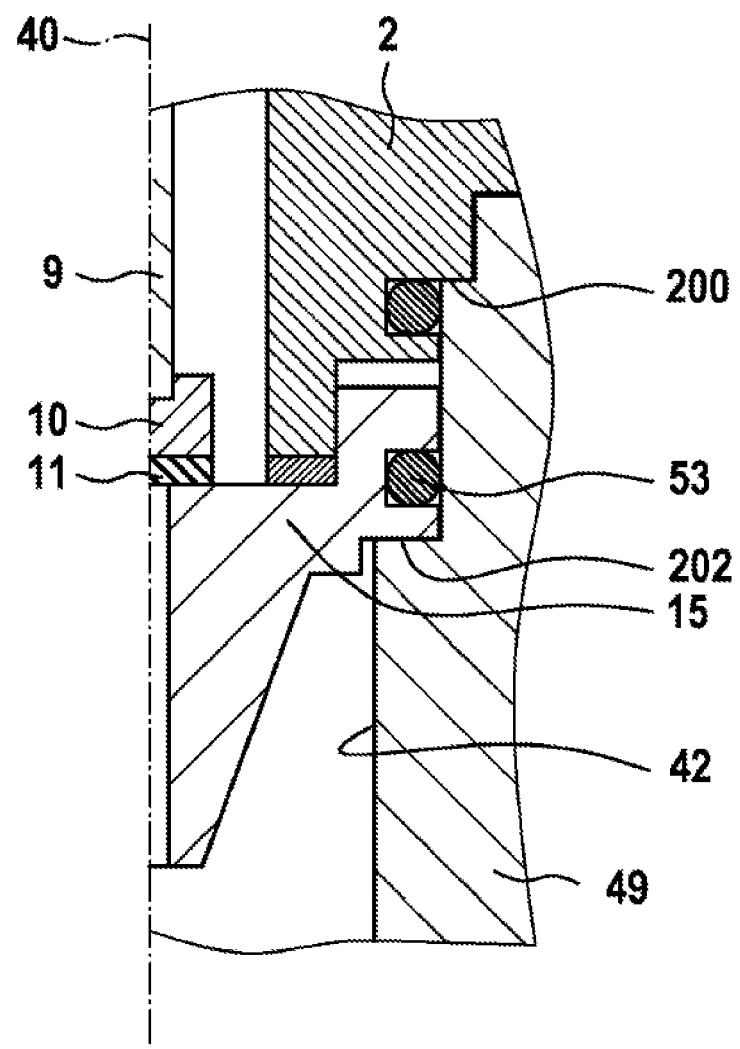

Furthermore, as FIG. 3 shows in an enlarged depiction, a first step 200 and a second step 202 are formed in the pump housing 49, radially with respect to the longitudinal axis 40, in the passage opening 80 of the pump housing 49, wherein the metering valve 1 with valve housing 2 is received in the pump housing 49. Thus the valve housing 2 of the metering valve 1 may be guided radially in the pump housing 49 and oriented accordingly in the passage bore 42, so as to ensure an exact and angularly precise orientation of the nozzle 15 of the metering valve 1 with respect to the mixer tube region 52. Here, the first step 200 is arranged radially above the supply channel 17 in the direction of the electromagnet 26, and the second step 202 is arranged below the supply channel 17 in the direction of the intake region 44. A distance is formed between the metering valve 1 and the first step 200, and also between the metering valve 1 and the second step 202, so that the metering valve 1 does not bear on the first step 200 and/or on the second step 202.

Function of the Jet Pump Unit 46

With the valve seat 19 of the metering valve 10 open or partially open, gaseous medium—here hydrogen—from the tank flows out of the supply channel 17 of the metering valve 1 into the passage channel 18 in the nozzle 15, via the valve seat 19. After emerging from the nozzle 15 and entering the passage bore 42 in the intake region 44, this hydrogen meets gaseous medium which has already been supplied to the fuel cell but not consumed, and has been returned into the jet pump unit 46 via the intake channel 43. The returned gaseous medium comprises mainly hydrogen but also water vapor and nitrogen. In the mixer tube region 52, by exchange of pulses of gaseous media, a mass flow is drawn in from the intake region 44 and conveyed in the direction of the outlet region 45 and hence in the direction of the anode region of the fuel cell. Depending on the geometry of the passage bore 42 and the insertion angle of the metering valve 1 and hence of the nozzle 15, the gas flow supplied to the fuel cell can be adjusted to meet demand.

What is claimed is:

1. A jet pump unit (46) comprising
   a pump housing (49),
   a metering valve (1) with a valve housing (2),
   a mixer tube region (52),
   an intake channel (43),
   a nozzle (15),
   and an outlet region (45),
   wherein a passage bore (42) constituting a passage opening (80) is formed in the pump housing (49),
   wherein the metering valve (1) is received in the passage opening (80) and a first step (200) and a second step (202) are formed in the passage opening (80), radially with respect to a longitudinal axis (40) of the jet pump unit (46), for radially centering and guiding the metering valve (1) in the pump housing (49),
   wherein the valve housing (2) includes a supply channel (17) that opens into an inflow region (28) inside the metering valve (1), the inflow region (28) being arranged along the longitudinal axis (40) and being at least in part defined within an end (38) of the valve housing (2),
   wherein the nozzle (15) includes a passage channel (18) and a pot-shaped region (151), the passage channel (18) arranged coaxially with the longitudinal axis (40) and extends from the pot-shaped region (151), and
   wherein the end (38) extends into the pot-shaped region (151) such that a face (381) of the end (38) of the valve housing (2) lies within the pot-shaped region (151) and abuts a counter-face (153) of the nozzle (15).

2. The jet pump unit (46) as claimed in claim 1, wherein the nozzle (15) is arranged coaxially in the jet pump unit (46), in front of the mixer tube region (52), by means of the first step (200) and second step (202).

3. The jet pump unit (46) as claimed in claim 1, characterized in that the supply channel (17) is formed in the metering valve (1), which supply channel (17) is formed at least partially in the pump housing (49), radially with respect to the longitudinal axis (40) of the jet pump unit (46), and opens into the passage opening (80), wherein the valve housing (2) is arranged by a step (37) on the pump housing (49) and is fixedly connected thereto.

4. The jet pump unit (46) as claimed in claim 3, characterized in that the first step (200) is arranged axially below the supply channel (17) in a direction relative to the supply channel (17) toward the outlet region (45), and the second step (202) is arranged axially below the supply channel (17) in the direction relative to the supply channel (17) toward the outlet region (45).

5. The jet pump unit (46) as claimed in claim 3, wherein the inflow region (28) is formed in the passage opening (80) of the jet pump unit (46).

6. The jet pump unit (46) as claimed in claim 1, characterized in that the passage bore (42) is conical at least in portions, wherein an outlet channel (48) of the jet pump unit (46) is formed in the pump housing (49), radially with respect to the longitudinal axis (40) of the jet pump unit (46), in a conical region of the passage bore (42).

7. A fuel cell arrangement with a jet pump unit (46) as claimed in claim 1, the jet pump unit being configured to control a hydrogen supply to a fuel cell.

8. The jet pump unit (46) as claimed in claim 1, characterized in that the supply channel (17) is formed at least partially in the pump housing (49), radially with respect to the longitudinal axis (40) of the jet pump unit (46), and opens into the passage opening (80), wherein the valve housing (2) is arranged by a step (37) on the pump housing (49) and is fixedly connected thereto by screw elements (35).

9. The jet pump unit (46) as claimed in claim 1, characterized in that the face (381) of the end (38) and the counter-face (153) of the nozzle (15) are cylindrical, and
   wherein the face (381) of the end (38) lies within the counter-face (153) of the nozzle (15).

10. The jet pump unit (46) as claimed in claim 9, characterized in that the face (381) and the counter-face (153) are arranged coaxially along the longitudinal axis (40) of the nozzle (15).

11. The jet pump unit (46) as claimed in claim 10, characterized in that an adjustment element (36) is positioned within the pot-shaped region (151), and
   wherein, in a direction parallel to the longitudinal axis (40), the adjustment element (36) is positioned between the valve housing (2) and the nozzle (15).

* * * * *